R. H. TUGGLE.
TRANSMISSION GEARING.
APPLICATION FILED SEPT. 8, 1916.

1,245,404.

Patented Nov. 6, 1917.

Witnesses
Helen F. Keith

Inventor
R H Tuggle
By
Attorney

UNITED STATES PATENT OFFICE.

RICHARD H. TUGGLE, OF QUINTON, ALABAMA, ASSIGNOR OF ONE-HALF TO CHARLES H. TUGGLE, OF QUINTON, ALABAMA.

TRANSMISSION-GEARING.

1,245,404.  Specification of Letters Patent.  Patented Nov. 6, 1917.

Application filed September 8, 1916. Serial No. 119,076.

*To all whom it may concern:*

Be it known that I, RICHARD H. TUGGLE, a citizen of the United States, residing at Quinton, in the county of Walker and State of Alabama, have invented certain new and useful Improvements in Transmission-Gearing; and I do hereby declare the following to be a full, clear, and exact description of the invention, such as will enable others skilled in the art to which it appertains to make and use the same.

This invention has for its object to provide an improved and efficient means, including a novelly constructed intermediate shaft and gear wheels supported thereon, whereby the rotary movement of a drive shaft may be transmitted to a driven shaft to rotate the latter in the same or opposite direction to the drive shaft, as desired.

Figure 1:
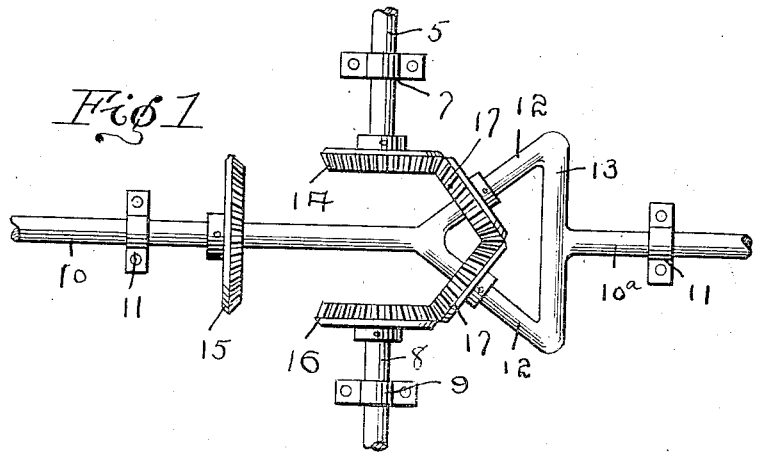
Figure 2:
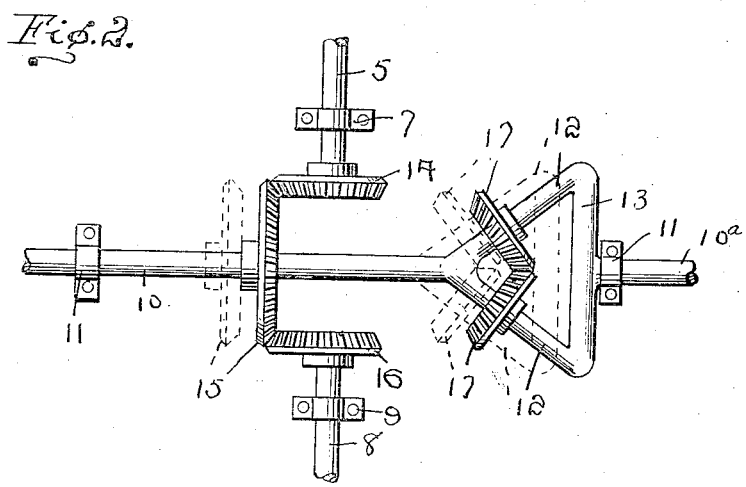

With this and other objects in view, the invention consists in the novel construction, combination and arrangement of parts as will be hereinafter specifically described, claimed and illustrated in the accompanying drawing, in which:

Figure 1 represents a plan view of the gear, showing the intermediate gear wheels meshing with the gear wheels of the drive and driven shafts, Fig. 2 represents a plan view similar to Fig. 1, showing the reversing gear in mesh with the drive and driven gear wheels, and showing, in dotted lines, the intermediate and reversing gear wheels in neutral or inoperative position with relation to the drive and driven gear wheels.

Referring to the drawing in detail, wherein similar reference numerals designate corresponding parts throughout the several views, the numeral 5 indicates a drive shaft suitably supported in a bearing 7 and arranged in axial alinement with the driven shaft 8, which is supported in a bearing 9.

The numerals 10 and 10ª indicate the axially alined sections of the intermediate shaft which are supported in bearings 11 and are integrally connected at the adjacent terminals by a triangular connecting member consisting of a pair of divergent shaft sections 12 having their spaced terminals connected with each other and with the adjacent shaft section 10ª by the connecting member 13. The intermediate shaft consisting of the sections 10, 10ª and triangular member are adapted for longitudinal movement in the bearings 11 and are secured against rotary movement therein.

A bevel drive gear wheel 14 is non-rotatably secured upon the end of the drive shaft 5 and is adapted to mesh with the reversing gear 15, which is rotatably and non-slidably mounted upon the shaft section 10. The reversing gear 15 is adapted to simultaneously mesh with the gear wheel 16 on the driven shaft 8 and is moved from one position to another with the shaft 10, which is operated by any preferred type of shifting mechanism.

A pair of intermeshing intermediate bevel gear wheels 17 are rotatably and non-slidably mounted upon the divergent shaft sections 12 and are adapted to be simultaneously moved into mesh with the drive and driven gear wheels 14 and 16.

In use, the intermediate shaft is moved to the position in Fig. 1 to cause the driven shaft 8 to be rotated in a direction corresponding to that in which the drive shaft 5 is rotating. However, when it is desired to drive the driven shaft in a direction opposite that of the drive shaft 5, the intermediate shaft is adjusted so as to move the reversing gear 15 into mesh with the drive and driven gear wheels 14 and 16, respectively, thereby causing the driven shaft to be rotated in a direction opposite to that in which the drive shaft is rotated. When the intermediate shaft is adjusted, as shown in dotted lines in Fig. 2, the connection between the drive and driven shafts is broken.

What I claim as new, is:

1. A device of the character described including alined drive and driven shafts, gear wheels carried by said shafts, a longitudinally movable intermediate shaft arranged between the drive and driven shafts and including a pair of divergent shaft sections, an intermeshing bevel gear, wheels rotatably mounted upon the divergent shaft sections adapted to mesh with the drive and driven gear wheels to operatively connect the latter.

2. A device of the class described including drive and driven shafts, gear wheels carried by said shafts, a longitudinally movable intermediate shaft including a pair of divergent shaft sections, intermeshing gear wheels rotatably mounted upon the divergent shaft sections, and a reversing gear wheel rotatably mounted upon the intermediate shaft movable into mesh with the drive and driven gear wheels.

3. A device of the character described including axially alined drive and driven shafts, drive and driven gear wheels carried by said shafts, a rotatably movable intermediate shaft disposed at right angles to the first-mentioned shafts and including alined sections, divergent shaft sections carried by one of the shaft sections, and a connecting member carried by the other shaft section connecting the spaced ends of the divergent shaft sections, a reversing gear wheel carried by the intermediate shaft movable into mesh with the drive and driven gear wheels, and intermeshing gear wheels rotatably mounted upon the divergent shaft sections movable into mesh with the drive and driven gear wheels.

In testimony whereof I affix my signature in presence of two witnesses.

RICHARD H. TUGGLE.

Witnesses:
FRANK O. HARRELL,
J. E. BLACK.

Copies of this patent may be obtained for five cents each, by addressing the "Commissioner of Patents, Washington, D. C."